Patented June 25, 1935

2,005,780

UNITED STATES PATENT OFFICE 2,005,780

MATERIAL FOR PROVIDING METAL WITH A PAINT RECEPTIVE SURFACE

James H. Gravell, Elkins Park, Pa., assignor to American Chemical Paint Company, Ambler, Pa., a corporation of Delaware No Drawing. Application May 23, 1932, Serial No. 613,131

8 Claims. (Cl. 148—6)

This invention relates to the art of preparing metal for the reception of paint or similar coatings and is particularly useful in connection with such preparation of cold rolled sheet steel.

Before specifying the objects of the invention or describing the means by which they are attained, I wish to call attention to the general character of the procedure to which my improvement particularly relates. Among the methods employed for preparing metal surfaces for the reception of paint is one wherein a composition of materials is applied to the surface in wet condition and permitted to remain thereon until evaporated to substantial dryness, whereupon the resultant residue is removed as by brushing, wiping, or the like. Compositions of this character act to neutralize soldering fluids, hand marks and acid runs; to absorb what oil may happen to be present on the metal; to remove, in a general way, any deleterious extraneous matter which may be present; and in addition to favorably affect the surface of the metal in a chemical way so as to give it added ability to hold and retain the coating of paint, enamel, japan, lacquer or varnish which is to be subsequently applied.

When using materials of the foregoing character in the manner specified considerable difficulty has been experienced in removing the resultant residue due to its great adherence to the metallic surface. This defect has seriously hindered the development of a method involving such a material because of the difficulty and cost involved in removing the residue.

With the foregoing in mind the objects of my invention will be better understood, and they may be said to reside primarily in the following: (1) the provision of an admixture or composition of materials for the purpose specified which may be easily removed after it has accomplished its ends; (2) a material reduction in the cost of preparing metal for painting; (3) a marked improvement in the finish of the final painted surface; and generally to improve the art of preparing metal for a painting or other finishing operation.

A composition of the character involved in the present invention should include an acid body, an ionizing solvent, and an absorbent material. The acid body dissolves the surface metal and exposes virgin metal which has not been contaminated by extraneous matter, and the absorbent, which is preferably in finely divided form, absorbs the reactive products as the ionizing solvent evaporates, thereby leaving a dry resultant residue which consists of the reaction products and the finely divided absorbent material. This residue is then removed from the prepared surface.

As above stated, it is the general property of materials of the character just described to adhere tightly to the metal, such adherence being very tenacious and requiring forceful and vigorous brushing, scraping or washing operations for successful removal. These are comparatively costly and, therefore, tend to defeat commercial adoption of the process.

I have discovered that a particular variety of natural clay which can be obtained in England has peculiar non-adhering properties when used as the absorbent in a mixture of the character described. The clay in question may be distinguished from others by the ability of its water suspension to form a plastic solid by the addition of furfural. The test which it is necessary for a clay to be potentially able to pass in order to meet the requirements of my improved admixture may be carried out substantially as follows:

125 cc. of cold water is placed in a 250 cc. beaker and sufficient clay is added to produce an admixture having a viscosity twice that of water, as measured by an inverted pipette. This usually requires from 50 gr. to 75 gr. of clay depending on its natural variation. 100 cc. of this admixture is then placed in a 150 cc. beaker and 12 cc. of furfural added. After vigorous stirring with a glass rod for about one minute, the liquid admixture is converted into a plastic solid and the beaker may be inverted without losing its contents.

The acid body of my composition should have an acid radical that does not cause a continuous rusting or corrosive effect, and I have found that those of the trihydric acids such as phosphoric acid or arsenic acid are particularly useful in producing my improved material because they do not have such rusting or corrosive action. The acid body itself may be the acid salt of such acids, for example, mono-iron phosphate, monocopper phosphate or mono-calcium phosphate.

By way of specific example a composition of materials having the improved properties incident to my invention may be made by mixing the following:

| | |
|---|---|
| Clay which has passed the furfural test | 30.00 pounds |
| Mono-calcium phosphate | 5.00 pounds |
| Water | 6.00 gallons |

Such a mixture forms a paint-like composition which may be made thicker or thinner by altering the amount of water called for by the formula.

The metal to be surfaced is first relieved of rust, paint or excessive coatings of grease or oil, and this may be done either mechanically or by the use of solvents. Such preparation should be done with sufficient care so as to avoid leaving on the metal more of these extraneous matters than can be taken care of by my improved admixture.

The metal so cleaned is then coated with my admixture by dipping, brushing or spraying. I prefer the latter method. The coating is then dried either by natural evaporation at approximately room temperature or by artificial evaporation in ovens heated to approximately 200° F. or less.

The time required for the evaporation, of course, depends considerably on atmospheric conditions and may vary from several hours at ordinary room temperatures to fifteen minutes at 200° F.

The substantially dry resultant residue is then removed by brushing or wiping, or it may be washed off with water or other non-harmful fluid, such as kerosene or alcohol. Indeed, the resultant residue is so non-adhesive that even a jet of air at 60 pounds pressure may be employed for its removal if desired. In fact in many cases my improved admixture produces a residue which actually tends to fall off the metal of its own weight, thereby reducing the removal cost to an absolute minimum.

The surface produced is free from deleterious extraneous matter and may be safely painted over without danger of development of defects therein. It is non-metallic in appearance and has a light gray color without much hiding properties. A dark surface with better hiding properties may be obtained by adding a coloring agent such as a dye or a soluble salt of a metal less basic than iron such as copper nitrate, although platinum chloride, silver nitrate, or mercuric chloride may be used with some success. I have found 0.50 pounds of copper nitrate added to the above formula produces the desired result.

In case a metallic surface is required, the acid salt is replaced by acid such as phosphoric or arsenic, using about the same amount as called for by my formula.

The above described admixture has considerable ability to absorb and remove films of oil from the surface of the metal being treated, yet if the surface to be treated is unusually oily difficulty may be encountered in making the material adhere to as well as in evenly covering the surface. In order to obviate this possible difficulty I find it useful to add a wetting agent to my admixture which may be any suitable substance compatible with the mixture, such as one of the various sulphonic acids, alcohols, ketones, ethers or esters, individually or collectively. I have found that good results can be obtained with the sulphonic acid of an aromatic hydrocarbon having an iso-propyl radical in the nucleus or with the salts of this acid or with alcohols of higher boiling points than ethyl alcohol such as butyl or amyl.

I should also like to call attention to the fact that the water given in the above formula may be omitted and a substantially dry powder produced which may be stored or shipped in that condition and the water added when the mixture is required for use. It is also possible to use only a portion of the water called for, whereupon a paste may be produced which can be subsequently thinned to the desired extent by adding the balance of the water.

I claim:—

1. A composition of materials of the class described for use in providing metal with a surface adapted to receive a coat of paint or the like, said composition including mono-calcium phosphate, an ionizing solvent, and clay characterized by the ability of 100 cc. of a water suspension thereof having twice the viscosity of water to form a plastic solid upon the addition of 12 cc. of furfural substantially as herein described.

2. A composition of materials of the class described for use in providing metal with a surface adapted to receive a coat of paint or the like, said composition including mono-calcium phosphate, water, copper nitrate, butyl alcohol, and clay characterized by the ability of 100 cc. of a water suspension thereof having twice the viscosity of water to form a plastic solid upon the addition of 12 cc. of furfural substantially as herein described.

3. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described.

4. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described, together with an ionizing solvent.

5. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described, together with an ionizing solvent and a wetting agent from the group consisting of sulphonic acids, alcohols, ketones, ethers and esters.

6. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described, together with an ionizing solvent and butyl alcohol.

7. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described, together with an ionizing solvent and a coloring agent from the group consisting of copper nitrate, platinum chloride, silver nitrate and mercuric chloride.

8. A composition of materials of the class described for use in providing metal with a surface adapted to receive a coat of paint or the like, said composition including an acid body having an acid radical from the group consisting of phosphates and arsenates, and clay characterized by the ability of 100 cc. of a water suspension thereof having twice the viscosity of water to form a plastic solid upon the addition of 12 cc. of furfural substantially as herein described, together with an ionizing solvent, a coloring agent from the group consisting of copper nitrate, platinum chloride, silver nitrate and mercuric chloride, and a wetting agent from the group consisting of sulphonic acids, alcohols, ketones, ethers and esters.

JAMES H. GRAVELL.